United States Patent
Von Bosch

(10) Patent No.: US 7,912,441 B2
(45) Date of Patent: Mar. 22, 2011

(54) APPARATUS AND METHOD FOR ENABLING NEAR FIELD COMMUNICATION EQUIPMENT IN A PORTABLE COMMUNICATIONS DEVICE

(75) Inventor: James A. Von Bosch, Crystal Lake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 540 days.

(21) Appl. No.: 11/954,210

(22) Filed: Dec. 11, 2007

(65) Prior Publication Data

US 2009/0150704 A1    Jun. 11, 2009

(51) Int. Cl.
*H04B 1/16* (2006.01)

(52) U.S. Cl. .................. 455/343.1; 455/343.5; 455/572; 455/41.1

(58) Field of Classification Search .............. 455/343.1, 455/343.2, 418, 574, 41.1, 572, 343.5, 69; 340/7.33, 989; 713/340
See application file for complete search history.

(56) References Cited

U.S. PATENT DOCUMENTS

| 7,117,023 | B2 | 10/2006 | Takeda et al. |
| 7,596,366 | B2 * | 9/2009 | Van Bosch et al. ......... 455/343.2 |
| 7,710,074 | B2 * | 5/2010 | Kim et al. ..................... 320/132 |
| 2003/0048768 | A1 | 3/2003 | Nakamura et al. |
| 2005/0164748 | A1 | 7/2005 | Kitaji |
| 2007/0232358 | A1 | 10/2007 | Sherman |
| 2009/0291634 | A1 * | 11/2009 | Saarisalo ..................... 455/41.1 |

OTHER PUBLICATIONS

PCT Search Report and Written Opinion, PCT/US2008/084179, dated Jul. 17, 2009, pp. 1-11.
Jean-Frabcois Durix & Jean-Philippe Audic, "Extracting Power From the Field On Contactless-Enabled Mobile Phones", Nov. 10, 2006.

* cited by examiner

*Primary Examiner* — John Lee
(74) *Attorney, Agent, or Firm* — Hitsashi D. Watanabe

(57) ABSTRACT

An apparatus and method for enabling a Near Field Communications (NFC) equipment integrated into a portable communications device, such that when the portable communications device's battery is low the residual charge of the battery is used to power the NFC equipment to enable various NFC applications without causing damage to the battery or portable communications device.

11 Claims, 2 Drawing Sheets

APPARATUS AND METHOD FOR ENABLING NEAR FIELD COMMUNICATION EQUIPMENT IN A PORTABLE COMMUNICATIONS DEVICE

FIELD OF THE DISCLOSURE

The present disclosure is related to Near Field Communication (NFC), transponders and mobile communications devices having integrated NFC circuitry, and to methods and apparatuses for controlling battery power conditions, particularly when the battery is in a low charge state and power is required to operate the NFC circuitry.

BACKGROUND

Near Field Communication (NFC) a short-range wireless connectivity technology having various standards such as Ecma-340 and ISO/IEC 18092. NFC technology uses magnetic field induction to enable communication between devices that are either touched together, or brought within a few centimeters of each other. NFC technology may be integrated with various devices such as mobile phones. Various applications, for example a credit card, may be securely provisioned to an NFC enabled mobile phone such that customers can pay for goods or services by simply waving their mobile phone at a point-of-sale reader. One of the many uses cases for NFC is to enable transit applications. In a transit application use case, a subscriber would utilize their mobile phones to board metro trains, buses, trams or other modes of transport.

A problem arises however when the mobile phone's battery is too low to power up the mobile phone. A user who must use their NFC enabled mobile phone at an NFC reader to board a mode of transport may not be able to make the transaction due to the low battery power.

One solution proposed to address this problem is to use the power derived from the NFC reader to enable the NFC circuitry of the mobile phone. However, testing has shown that there are many use cases where adequate power cannot be derived from the NFC field alone to power up the NFC circuitry and the other needed mobile phone components, such as a SIM card or SD Card. The size of the NFC coil in the mobile phone and the reader, along with the proximity of the two devices to each other can significantly affect the power derived from the field.

Operators desire NFC applications such as ticketing to work even when a mobile phone's battery is insufficient to power up the handset. Thus, what is needed and does not exist today is a solution to allow an NFC application to work when a mobile phone's battery is too low to power up the mobile phone.

DETAILED DESCRIPTION

In the embodiments a mobile phone, or other portable device, battery residual charge may be used to supply power to an NFC transceiver and SIM card to allow an NFC application to function without causing damage to the battery. In some embodiments for example, the mobile phone battery residual voltage range may be 2.6 to 3.1 Volts.

The methodologies of the embodiments as disclosed herein ensure that no damage occurs to the battery due to charge drainage beyond its acceptable operational levels. The embodiments also provide methods for correctly setting voltage to a SIM card and methods such that various batteries having different operating characteristics will be used correctly.

Figure 1:
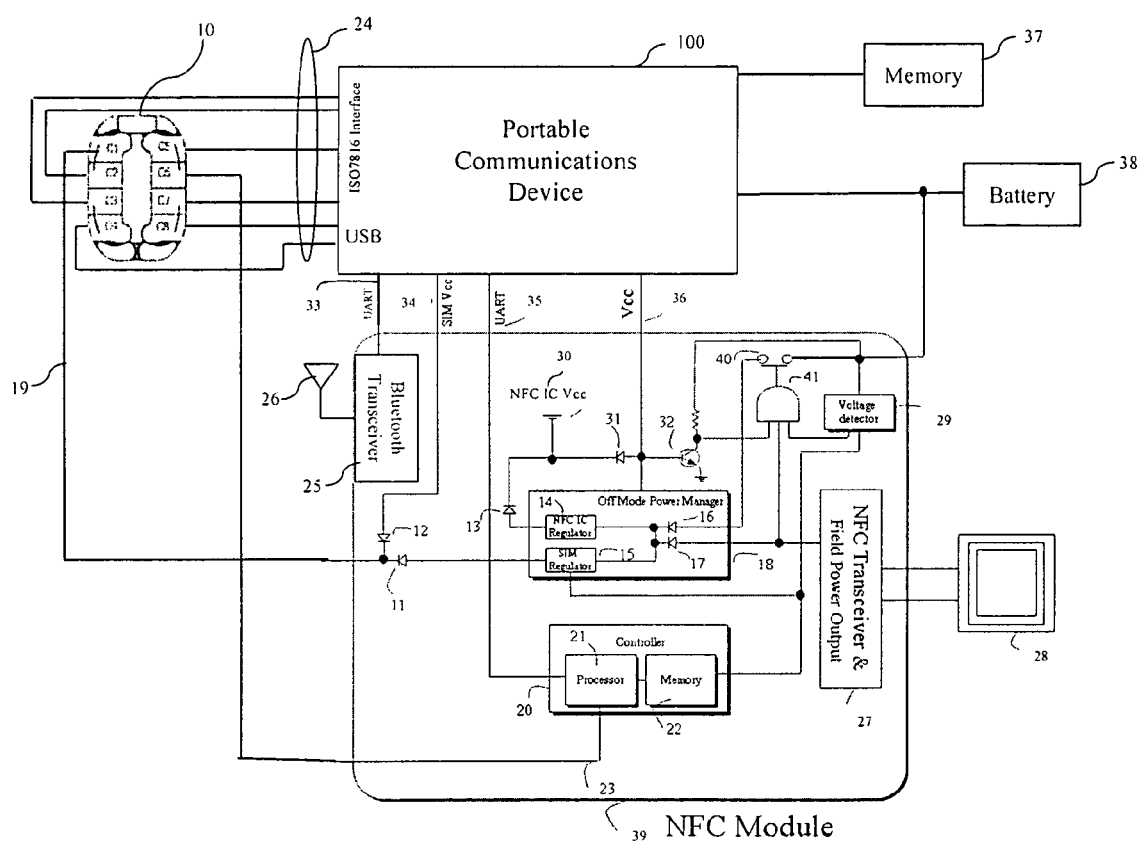
FIG. 1 is a diagram of a portable communication device architecture having an integrated Near Field Communication (NFC) module and circuitry in accordance with the embodiments.

Turning now to the drawings, FIG. 1 provides details of a portable communications device architecture, such as a mobile phone architecture, in accordance with an embodiment. A portable communication device 100, such as a mobile phone, comprises a non-volatile memory 37, a battery 38, which may be a lithium-ion battery, a Subscriber Identity Module (SIM) card interface 24, such that a removable SIM card may be installed within, and a Near Field Communication (NFC) module 39. The SIM card is represented in FIG. 1 only by its connection interface, SIM connections 10. The SIM card interface may be for example an ISO7816 standard interface.

The portable communication device provides various interfaces to the NFC module 39 such as a supply voltage Vcc 36 and a SIM card supply voltage, SIM Vcc 34. The supply voltage Vcc 36 provide power to the NFC module 39, and the various components such as controller 20 which comprises processor 21 and memory 22 and NFC transceiver 27, through diode 31 at the NFC IC Vcc 30 connection, when the portable communication device 100 is powered on. The portable communication device 100 may further provide various universal asynchronous receiver/transmitter (UART) interfaces for translation of data and communication between the NFC module 39 controller 20 and in some embodiments a Bluetooth™ transceiver 25, and the portable communication device 100. Therefore the portable communication device 100 will provide UART interface 35 to the NFC module controller 20 and in some embodiments will also provide UART interface 11 to the Bluetooth™ transceiver 25.

The NFC module 39 comprises the controller 20, which further comprises a processor 21 and a non-volatile memory 22, the processor coupled to the SIM card via a communication line 23 to the SIM connections 10. The NFC module contains the NFC transceiver 27 coupled to an NFC antenna 28, for communicating with NFC reader devices. In some embodiments the NFC module 39 will also have a Bluetooth™ transceiver 25 and a corresponding antenna 26 for communication with various Bluetooth™ devices.

In accordance with the embodiments a circuitry is integrated into the NFC module 39 to detect the presence of an NFC field, monitor the battery 38 voltage and provide an indication that the battery 38 is within acceptable voltage levels and an indication that the portable communications device 100 is on or off.

The indications are then used to enable, via AND gate logic 41, a switch 40 to connect the battery 38 to the NFC components of NFC module 39. For the switch 40 to be activated by the AND gate 41 logic, the battery 38 must be within acceptable voltage limits as determined by voltage detector 29, an NFC field must be detected by the NFC transceiver 27, and the portable communication device 100 must be off as determined by the transistor 32.

The battery voltage detector 29 thresholds are programmable via an application processor (not shown) of the portable communication device 100 based on information received from the battery 38 or stored in its non-volatile memory 37 at the time of manufacture. On power up, or alternatively power down, the battery 38 low voltage detector 29 threshold is checked and programmed into the non-volatile memory 22 of the NFC module 39 controller 20.

If the battery 38 low voltage detector 29 determines that the battery 38 voltage has fallen too low, the switch 40 is automatically turned off and the battery 38 is thus disconnected from the NFC module 39. This prevents the battery 38 from being discharged to too low of a voltage level and possibly being damaged.

In an alternative embodiment, a programmable hang timer (not shown) may be utilized to delay the battery 38 from immediately switching off. The timer is useful for conditions in which the NFC field may be too weak or intermittent.

Further in accordance with the embodiments, power derived from the NFC field is summed with the residual charge of the battery 38 to minimize the drain from the battery when operating in the low battery mode of operation. A logical "OR" circuitry of an Off Mode Power Manager module 18 consists of a first diode 16 and second diode 17, where the first diode 16 provides a current path from the battery 38, when logical switch 40 is in a closed position, and where the second diode 17 provides a current path from an NFC field via the NFC transceiver 27.

It is to be understood that the circuit elements or components illustrated by FIG. 1 are exemplary only and for the purpose of conveying to one of ordinary skill how to make and use the various embodiments disclosed herein. Therefore it will be apparent that such circuit elements, and/or components may be implemented in various ways such as by discrete circuit components, logic circuits, integrated circuits and/or software so as to obtain the results obtained as described using the examples illustrated by FIG. 1 and therefore any and all such implementations remain in accordance with the embodiments herein disclosed.

Returning to FIG. 1, the Off Mode Power Management module 18 also comprises an NFC IC regulator 14 and a SIM regulator 15 for controlling the specific voltages supplied to the NFC module components and the SIM card, respectively. The summed power from an NFC field and a residual battery 38 voltage may be provided to the NFC module 39 NFC IC Vcc 30 connection from NFC IC regulator 14 through diode 13.

When an NFC field is detected, and if the battery 38 voltage level is acceptable as determined by voltage detector 29, and the portable communication device 100 is powered off as determined by the transistor 32, then the logical AND gate 41 will close switch 40 so that the battery 38 power is connected to the NFC module 39 circuitry through diode 16. Diode 17 will remain reversed biased until the NFC field power voltage is higher then the battery 38 voltage. Thus if the NFC field power does not overcome the battery 38 residual voltage then the NFC module 39 will operate solely from the battery 38 residual voltage. However if the NFC field power becomes sufficiently strong and achieves a voltage higher than the battery 38 residual voltage then diode 16 will be reverse biased and will provide power to the NFC module 39.

Another aspect of the embodiments is to ensure that the correct power supply voltage is presented to the SIM card. This is accomplished at the time the portable communication device 100 is powered on. Detection of the appropriate SIM card voltage by a portable communication device is defined in the ETSI standards such as ETSI TS102 221 which is hereby incorporated by reference herein. The portable communication device 100 therefore incorporates a means to detect the correct SIM card voltage, which may be for example 1.8, 3 or 5 volts. Once detected the portable communication device 100 application processor sets the correct SIM card voltage in the NFC power management non-volatile memory 22. Once the correct SIM card voltage is set in memory 22, this voltage will be used when the portable communication device 100 is powered off to correctly power up the SIM card when needed by the NFC module 39.

Setting the correct SIM card voltage up front, in accordance with the embodiments, speeds the transaction process which is important for low battery use cases. An additional use case may occur wherein the user may swap out the SIM card while the battery 38 is discharged to the extent that the NFC module 39 cannot establish communications with the SIM card. In this case, the NFC module behaves in accordance with, or similar to, the procedures described in the ETSI TS102 221 specification. The procedure, as defined by TS102 221, will first attempt SIM communications at the voltage set in memory 22. If this is not successful then the NFC module 39 will attempt a different voltage until all possible voltage levels are tried.

In another embodiment, the portable communication device may also comprise the Bluetooth™ transceiver 25 and antenna 26 in addition to the various NFC components.

In this embodiment, the Bluetooth™ components will only be powered up while the portable communication device is in the "on" state. The NFC components may be powered up directly from the portable communication device via Vcc 36 or directly from the battery 38 through the logical switch 41 which may also be connected to the Bluetooth™ transceiver 25.

Figure 2:
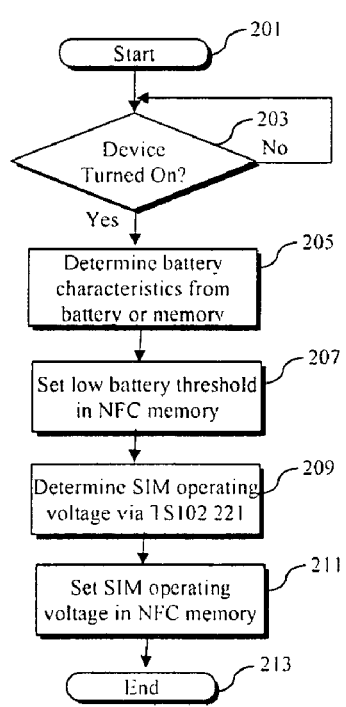
FIG. 2 is a flow chart illustrating operation of the embodiments with respect to determining a correct voltage of a Subscriber Identity Module (SIM) card.

FIG. 2 summarizes operation of the embodiments with respect to supplying an appropriate voltage to a SIM card. The method begins at 201 and in block 203 the determination of whether the portable communication device 100 is powered on. If the device is powered on then in 205 the device determines the battery 38 characteristics from either the battery 38 itself or from the portable communication device 100 memory 37. In 207, the determined battery 38 threshold is added to the NFC module 39 memory 22. In 209 the portable communication device 100 or the NFC module 39 will determine the appropriate SIM voltage using standard procedures and set the SIM operating voltage in the NFC module 39 memory 22 as shown in 211.

Figure 3:
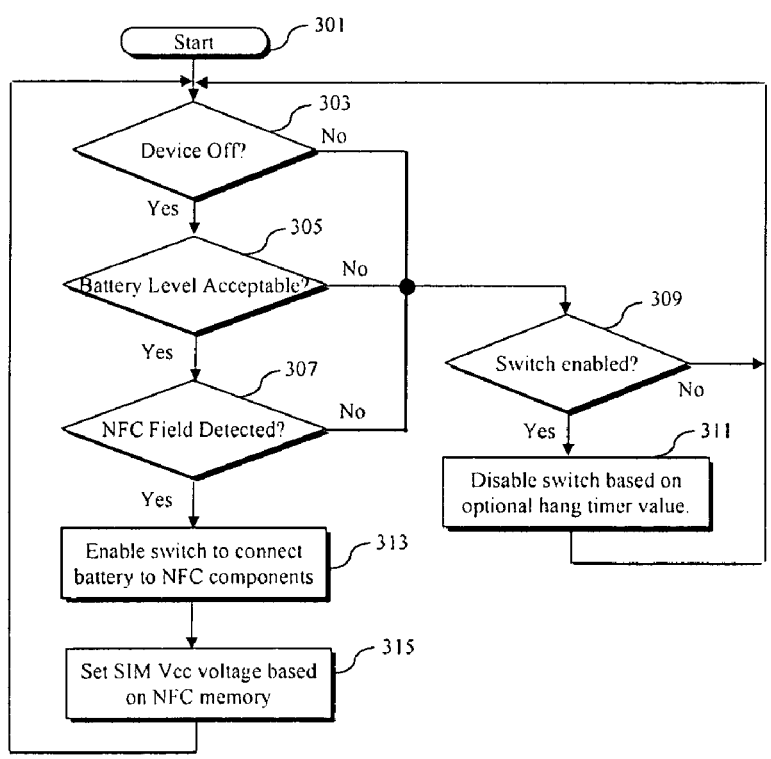
FIG. 3 is a flow chart illustrating operation of a battery voltage detector in accordance with the embodiments.

FIG. 3 illustrates operation of the battery voltage detector 29 in accordance with the embodiments. The method begins in 301 and the embodiments determine whether the portable communication device 100 is powered off. As discussed previously, this is accomplished using the circuitry exemplified by transistor 32 in conjunction with logical AND gate 41. In 305 the voltage detector 29 provides an indication of whether the battery 38 voltage is at an acceptable level, that is, whether the battery voltage is at a critical level such that the battery may be damaged if operated to provide further power. Therefore, an "acceptable level" as used herein is a voltage level, which may be a residual voltage level, determined by the battery 38 characteristics and/or the battery 38 manufacturer specifications, at which the battery 38 may be operated without causing irreversible damage to the battery 38. Therefore, in 309, if the switch 40 is in a closed position such that the battery 38 is providing power to the NFC module 39, and if the battery level detected in 205 is not acceptable, the switch 40 will be disabled, that is, placed in the off state or open condition as shown in 311. In an alternative embodiment, a hand timer may also be employed in 311 as was discussed previously. Otherwise, if the switch 40 was not activated, no action will occur at 309, and the method loops back to start 301.

Returning to decision block 305, if the battery 38 level is acceptable, then a determination is made of whether an NFC field is present in 307. This is accomplished as described previously via logical AND gate 41, NFC transceiver 27. Thus the NFC transceiver provides another input to logical AND gate 41, the input being a logical one if an NFC field is detected. If no field is detected the method continues at 303 as shown.

If an NFC field is detected then as in 313 the switch 40 is enabled, or placed in a closed position, such that the battery 38 is connected and supplies power to the NFC module 39. In 315 the appropriate SIM card supply voltage is set as defined in NFC module 39 memory 22 described previously.

The embodiments herein disclosed may be used in any NFC enabled device for conditions wherein sufficient power cannot be derived from the NFC field to reliably operate a desired NFC application. The embodiments herein disclosed have specifically addressed the handling of low power battery modes of operation to safely protect the battery and the operation of the portable communications device.

While various embodiments have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. A method of enabling a near field communication operation of a battery powered portable device, a battery being in a discharged state and having a residual charge, said method comprising:
   determining a characteristics of said battery by reading said characteristic from a first memory;
   programming said characteristics into a second memory, said second memory being associated with a near field communication component of said battery powered portable device;
   said battery being in a discharged state and having a residual charge, said residual charge being at least a minimal charge specified for operation of said battery without causing damage thereto by excessive discharge;
   detecting the presence of a near field communication field;
   determining that said battery powered portable device is powered off such that said battery is disconnected from said near field communication component of said battery powered portable device;
   monitoring a voltage level of said battery such that said residual charge does not drop below a damaging voltage level; and
   activating a switch to connect said battery to said near field communication component.

2. The method of claim 1 further comprising:
   setting a threshold for said voltage level, said threshold for use by a voltage detector component of said battery powered portable device.

3. The method of claim 1, wherein determining a characteristics of said battery by reading said characteristic from a first memory, further comprises:
   reading said characteristic from a memory located in said battery, wherein said first memory is said memory located in said battery.

4. The method of claim 1, wherein determining a characteristics of said battery by reading said characteristics from a first memory, further comprises:
   reading said characteristic from a memory located in said portable communication device, wherein said first memory is said memory located in said portable communication device.

5. The method of claim 1, wherein activating a switch to connect said battery to said near field communication component, further comprises:
   summing a first voltage from said battery with a second voltage from said near field communication field to produce a summed voltage and providing said summed voltage to said near field communication component.

6. A method of enabling a near field communication operation of a battery powered portable device, a battery being in a discharged state and having a residual charge, said method comprising:
   determining by a voltage detector that said battery is in a discharged state and has a residual charge, said residual charge being at least a minimal charge specified for operation of said battery without causing damage thereto by excessive discharge;
   detecting the presence of a near field communication field by a near field communication transceiver, said near field communication transceiver being included in a near field communication module;
   determining that said battery powered portable device is powered off such that said battery is disconnected from a near field communication component of said battery powered portable device;
   monitoring a voltage level of said battery such that said residual charge does not drop below a damaging voltage level; and
   activating a switch by a logical AND circuit, said logical AND circuit having a first input indicating that a near field communication field has been detected, a second input indicating that said voltage level is above said damaging voltage level, and a third input indicating that said portable device is powered off, and connecting said battery to said near field communication component via said switch.

7. The method of claim 6, further comprising:
   providing said third input indicating that said portable device is powered off via a transistor circuit, said transistor circuit providing a logical one indication when said portable device is powered off and providing a logical zero indication when said portable device is powered on.

8. The method of claim 6, wherein acting a switch by a logical AND circuit, further comprises:
   summing a first voltage from said battery with a second voltage from said near field communication field to produce a summed voltage and providing said summed voltage to said near field communication module.

9. A method of setting an operating voltage of a component of a battery powered portable device, said battery powered portable device having a removable installed battery, said component for use in conjunction with a near field communication component, said method comprising:
   said battery being in a normally charged state, said normally charged state allowing for normal operation of said battery powered portable device, said near field communication component and said component;
   determining an operating voltage of said component;
   setting said operating voltage of said component in a memory of said near field communication component;
   detecting the presence of a near field communication field;
   determining that said battery powered portable device is powered off such that said battery is disconnected from a near field communication component of said battery powered portable device; and applying said operating voltage to said component, said operating voltage being read from said memory.

10. The method of claim 9 wherein determining an operating voltage of said component further comprises:

determining an operating voltage of a Subscriber Identity Module (SIM).

11. The method of claim 9 wherein determining an operating voltage of said component further comprises:

determining an operating voltage of a Secure Digital (SD) device.

* * * * *